United States Patent Office 2,897,368
Patented July 28, 1959

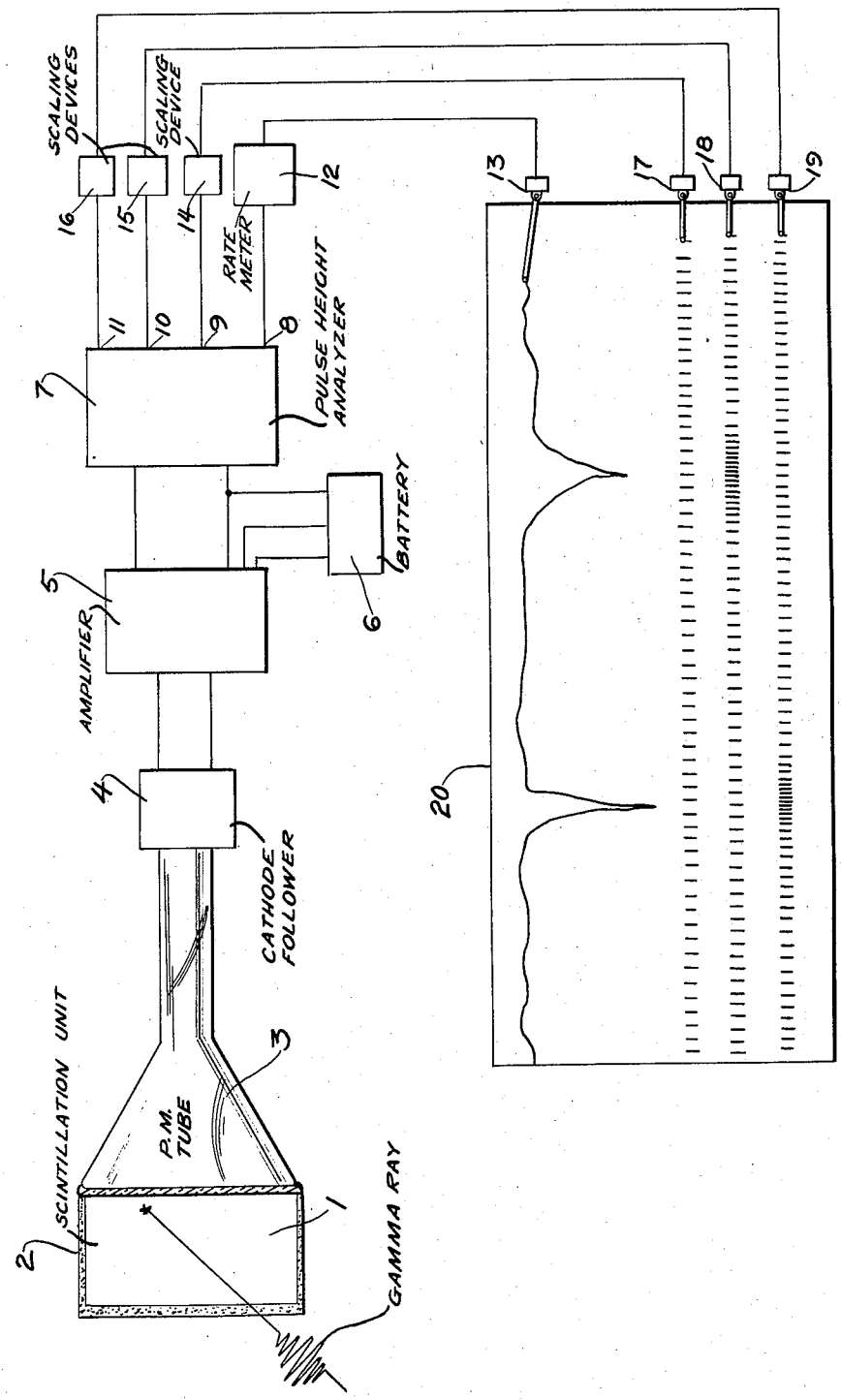

2,897,368

AERIAL GEOPHYSICAL EXPLORATION WITH SCINTILLATION SPECTROMETER

Hans T. F. Lundberg, Toronto, Ontario, and Robert W. Pringle, Kenneth I. Roulston, and George M. Brownell, Winnipeg, Manitoba, Canada Application March 18, 1954, Serial No. 417,154

7 Claims. (Cl. 250—71)

This invention relates to an instrument for aerial geophysical exploration with a scintillation spectrometer, and has for an object to locate mineral deposits, such as ores, oil and gas, through providing for the identification of radioactive substances from an aircraft by pulse height sorting of the effects of their gamma rays.

Another object is to provide for separating the effects of radium, thorium, and potassium on the basis of their gamma ray spectra.

Another object is to provide for the counting of events at, or above, a certain energy band, or level, which is characteristic of a selected source of gamma rays.

Another object is to provide for simultaneously receiving and recording the amplitude of total gamma ray intensity from the earth's surface in terrain under investigation, as well as variations (preferably modulated) in gamma ray intensity derived from different sources such as radium, thorium and potassium, singly and/or in combination.

Another object is to provide an instrument for the hereinabove stated purpose which includes scintillation means, photomultiplier means, and amplifying means, adapted to be connected with a suitable source of electric power, together with pulse height analyzing means having an output fitted with a rate meter for indicating the total gamma ray variations in terms of amplitude, i.e., an integral discriminator output; and also having, at least one, preferably several differential discriminator outputs each advantageously fitted with a scaling device for indicating the gamma ray variations emanating or derived from individual or multiple sources, e.g., thorium, radium and thorium, and potassium.

Another object is to furnish the integral output with a continuously acting tracer recording pen, and to furnish the differential outputs with intermittently acting relay pens whereby there may be imposed upon the recorder tape a continuous delineation of the integral amplitude variations due to anomalies, as well as complementary opposed dash lines expressing as density the differential variations related to separate sources of the gamma rays.

Another object is to achieve simplicity in the construction and operation of the instrument as well as to render the instrument easily portable and eminently suited to transportation by, and operation during the flight of, an aircraft.

A further object is to provide certain improvements in the form, construction and arrangement of the parts of the instrument, thus effectively attaining the above recited objects and others inherent in the invention.

In brief summary, the invention envisages an instrument for aerial geophysical explorations which embodies means, preferably a unit, that has the characteristic capacity of producing light photon scintillations as a result of the impact of gamma ray energy; the said means operatively connected with a device, such as a photomultiplier tube, which is designed and adapted to accept the scintillations and convert them into photo-electron voltage pulses. Means for amplifying said pulses to increase their voltage is in operative association with the output of the photomultiplier, and a device, which may be defined as a pulse height analyser or discriminator is, in turn, connected with the amplifier. This analyser is fitted with several outputs, one for the function of integral discrimination or total gamma rays intensity variation recording; and the others, preferably three, to serve as differential discriminators and record gamma ray variations attributable to particular sources, preferably, thorium alone, radium and thorium, and potassium alone. The integral output desirably performs through a rate meter device, while the differential outputs preferably act through scaling devices. A recording tape is appropriately fed and pens associated with the several outputs visually inscribe on the tape variations in the above named gamma ray effects due to the presence of anomalies in the terrain being explored. It is preferred to use a tracer pen for the integral output and relay pens for the differential outputs. Flights of the aircraft carrying the instrument are made over the terrain along predetermined profiles, in substantial parallelism and, if desired, crossing, at advantageous constant heights e.g., between two hundred and three hundred fifty feet, and the recordings obtained are appropriately processed, adjusted to linear scale, plotted, and interpreted as to significant indications. The effect of contamination rays from e.g., fluorescent dials, should be carefully avoided, as by shielding; but the instrument is so efficient in detecting gamma rays that cosmic rays, of which the freqeuncy is low, may be regarded as relatively negligible.

This invention may be considered as an extension or development of the subject matter of U.S. Patent No. 2,686,266, issued August 10, 1954 to Robert W. Pringle, Kenneth I. Roulston and George M. Brownell.

A practical embodiment of the instrument is diagrammatically represented in the accompanying drawing to which reference will now be made.

The scintillation means, here shown as a phosphor unit, is denoted by 1, and may be composed of any suitable substance having the above mentioned capacity of responding with the emission of light photon scintillations when bombarded by or under the impact of gamma rays. Examples may be cited as sodium iodide activated with thallium; cesium iodide activated with thallium; anthracene; and plastic or liquid scintillators, especially if these contain heavy elements such as mercury. The first named has been found to give excellent results. It should be of large size, to give adequate sensitivity of detection, and must have a thickness greater than the range of secondary particles produced by the gamma radiation in the phosphor. This latter condition is necessary if the device is to act as a proportional counter and give a measure of the gamma ray energy. The perimeter and one face of the phosphor unit are advantageously coated with a layer 2, such as magnesium oxide, which functions as a light scatterer. If sodium iodide is used, care must be taken to protect the phosphor against the effects of moisture. If preferred, the scintillating unit may be in liquid form confined within a suitable container.

The face of the unit that is uncoated with magnesium oxide, or other reflector, is secured to that end of a photomultiplier tube 3 which is distant from its base and cathode follower 4, the preferred adhesive being a silicone oil which provides an optical bond. The tube 3 may be selected from those available on the market, it being desirable to choose one of very high efficiency especially with respect to multiplication and amplification; and its cathode is formed with the usual photosensitive surface which, when illuminated by scintillations from the unit 1, converts the same into current or voltage pulses, which latter are amplified by the multiplier component of the tube in a well understood manner.

An amplifier 5, which may be of conventional type, e.g., linear, is electrically connected to the output of the photomultiplier tube and serves materially to increase the voltage of the pulses emitted by the tube. Electric power is supplied by a battery 6 that is in circuit connection with both the tube and the amplifier. A small but adequately powerful, e.g., one thousand volt, battery is highly desirable, such as the nickel cadmium alkaline type, for the photomultiplier. Alternatively, power may be obtained from any available source, conveniently the electrical system of the aircraft in which the instrument is carried.

The output of the amplifier 5 is led to a discriminating device in the form of a pulse height analyser denoted by 7. Such a device is fully disclosed in the above mentioned Patent No. 2,686,266, and it is deemed unnecessary to detail the same herein; though it may be generally characterized as embodying a "flip-flop" or univibrator circuit including a detector and a discriminator the tubes of which are normally in a stable condition which increase of voltage changes to unstable and then causes a "flip" over to a meta-stable condition that continues until change in voltage re-establishes instability and causes a "flop" back to stability. The pulse required to effect this action is termed a "trigger" pulse and will vary with the bias setting of the device, thus permitting discrimination against pulses below any selected amplitude or height.

The analyser or discriminator 7 is fitted with four outputs 8, 9, 10 and 11. Output 8 provides an integral discrimination of total gamma ray intensity in amplitude, and is in electrical connection with a rate meter 12. This device is also fully disclosed in the above named Patent No. 2,686,266, and it is believed sufficient to note that it takes the form of a micro-ammeter which indicates average current passing through one tube of the "flip-flop" circuit and presents a reading that is proportional to the rate at which pulses are accepted by the "flip-flop" circuit. By suitable adjustment, the time during which the rate meter averages the current may varied. The output of the rate meter is connected to a recording device, preferably in the form of a tracer pen 13, adapted to inscribe a continuous line on a recorder tape.

Having in mind the fact that the functioning of the scintillation spectrometer is based on the proportionality between the energy of a gamma ray event occurring in the sensitive component of the instrument and the voltage output from the latter, it is evident that means and method of pulse height sorting is needed if the instrument is to provide full information as a gamma ray spectrometer. It is also an important, if not essential, requirement that the means for this accomplishment in aerial exploration incorporate simplicity in design and demand a minimum of servicing. The pulse height sorting is also affected by the known facts that the gamma ray spectrum from potassium consists of a single line at 1.47 Mev. (million electron volts); while the spectra from radium and thorium are complex and consist of numerous lines extending in the case of radium to a weak line at 2.20 Mev., and in the case of thorium to a strong line at 2.62 Mev. Accordingly, the effect of potassium can be eliminated through a bias setting of the analyser above 1.50 Mev. while leaving the latter responsive to the combined effects of radium and thorium each of which is characterized by a plurality of lines above such a setting. Likewise, it will be clear that enhancement of the effect of potassium may be achieved by a bias setting at or close to 1.47 Mev. where its spectrum is centered.

With the foregoing observations in mind, our invention contemplates provision for identification of the above named individual elements through recordings made while in flight, by combining with the pulse height analyser, in addition to its integral discriminator output 8 and the rate meter 12, the plurality, three being shown, of differential outputs, denoted by 9, 10 and 11; each of the latter preferably being electrically connected with a scaling device to demodulate (or demultiply) the pulses from the said three outputs. The scaling devices for outputs 9, 10, 11, are marked 14, 15, 16, respectively; and each is, in turn, in operative electrical connection with suitable visual recording means that preferably comprises a relay and its pen designed to act intermittently and inscribe a row of discrete dash lines on a recorder tape that is moved in contact with the pens. In the drawing the relays and their pens are indicated by 17, 18, 19, and the recorder tape by 20.

The construction and mode of operation of scaling devices called "scale of two" is understood by those skilled in electrical engineering, but it may be pertinent to recite that the device embodies a biased multivibrator circuit with a diode input for triggering its action. In each of our devices 14, 15, 16, we have combined four such "scale of two" units with the output of the last unit fed to an additional multivibrator that presents a current pulse of sufficient power to operate the pen relay. Thus our form of scaling device produces one output pulse for each sixteen pulses fed to it and may be denominated a "scale of sixteen" unit. Its purpose and function are to demultiply or demodulate, and hence statistically smooth, the output of pulses from the analyser with the result of inscribing on the tape 20 density type markings that are easily read. In order to adapt the instrument to a wide range of pulse counting rates, the scaling devices are so arranged that each may be operated on a scale of two, four, eight or sixteen.

It will be observed from the drawing that the inscriptions of the tracer pen 13 and relay pens 17, 18, 19, are opposed or aligned so as to complement each other and, being simultaneously produced, they enable constant visual observation of their significance as well as providing permanent indications for study and processing.

Briefly summarizing the operation of the instrument; gamma rays (one being indicated on the drawing) from the earth's surface, as the aircraft carrying the instrument passes thereover, impinge upon and penetrate the phosphor 1, which latter responds with scintillations that are received by the photomultiplier tube 3, converted into photo-electrons that are multiplied in number to produce voltage pulses which are increased by the amplifier 5. These voltage pulses are transmitted to the pulse height analyser 7 which is equipped with four outputs; one for integral discrimination, followed by amplitude recording of total gamma ray intensity, and the other three for differential discrimination, followed by density recording, of gamma ray intensity from selected sources. It has been found practical and successfully useful to select as these sources thorium alone, radium and thorium together, and potassium alone. These sources are identified in terms of their characteristic gamma ray spectra. The integral amplitude discrimination is fed through the rate meter 12 and inscribed on the tape 20 by the tracer pen 13 as a line of intensity, while the differential discriminations are fed through the scaling devices, demodulated or demultiplied thereby, and inscribed on the tape 20 as rows of dash lines indicating density. The record of the several indications thus simultaneously produced is in such form that all the markings complement each other and present the whole significant picture. The pulse height analyser is adjustable to various spectrum ranges to record variations due to anomalies in the effects of chosen sources; while the scaling devices are also adjustable in respect to demodulation and/or demultiplying; and the record obtained supplies desired information with respect to the presence, location, and identification of the sought for elements or substances.

Referring to the drawing, the relay pen 17 may be considered as recording effects of thorium alone, pen 18 as recording effects of radium and thorium together, and pen 19 as recording effects of potassium alone. It will thus be observed that a notable density recording by pen 18 is aligned with one peak in the tracer line of pen 13; while a notable density recording by pen 19 is aligned with a second peak in the line of pen 13, thereby indicating the sources of the effects causing the said peaks.

In this connection, it is deemed pertinent to point out that the radioactive so called "halo" which is known to surround oil and/or gas deposits, consists of radium-uranium effects, and that, accordingly, the capacity of the present invention relating to the detection of particular sources of gamma radiation renders it peculiarly and admirably suited to exploration for oil and/or gas because of the facts just stated as well as the inherent characteristics of the invention in general.

The instrument is simple in design and construction, readily portable, requires a minimum of servicing, and is admirably suited to aerial exploration.

If conditions so dictate, efficiency of the instrument may be promoted by the use of a plurality of scintillation units and photomultiplier tubes in combination with the other components of the instrument.

We desire it to be understood that various changes may be resorted to in the form, construction, arrangement and material of the instrument without departing from the spirit or scope of the invention; and hence we do not intend to be limited to details herein shown or described except as they may be included in the claims or be required by disclosures of the prior art.

What we claim is:

1. An instrument designed and adapted for aerial geophysical exploration in the search for and identification of mineral deposits such as ores, oil and gas comprising, means for reacting to the impact of gamma rays from the earth's surface by the production of photon scintillations, photomultiplier means operatively connected with the said gamma ray reacting means for receiving such scintillations and converting them into photoelectrons sufficient to produce voltage pulses, means for amplifying said pulses, pulse height analysing means for receiving such amplified pulses and discriminating them both integrally and differentially, and means operatively connected with said analysing and discriminating means for simultaneously producing records showing both amplitude variations in total gamma ray intensity received from the terrain being explored and density variations in gamma ray intensity derived from at least one selected source of the rays in said terrain, the said scintillation means being of such size as to enable the simultaneous production of both said records and of a thickness greater than the range of secondary particles produced in said scintillation means by the gamma radiation.

2. An instrument as defined in claim 1, in which the scintillation means includes a plastic unit.

3. An instrument designed and adapted for aerial geophysical exploration in the search for and identification of mineral deposits such as ores, oil and gas comprising, means for reacting to the impact of gamma rays from the earth's surface by the production of photon scintillations, photomultiplier means operatively connected with the said gamma ray reacting means for receiving such scintillations and converting them into photoelectrons sufficient to produce voltage pulses, means for amplifying said pulses, pulse height analysing means for receiving such amplified pulses and discriminating them both integrally and differentially, and means operatively connected with said analysing and discriminating means for simultaneously producing records showing both amplitude variations in total gamma ray intensity received from the terrain being explored and density variations in gamma ray intensity derived from at least one selected source of the rays in said terrain.

4. An instrument as defined in claim 3, which includes at least one scaling device for the density recording.

5. An instrument designed and adapted for aerial geophysical exploration in the search for an identification of mineral deposits such as ores, oil and gas comprising, means for reacting to the impact of gamma rays from the earth's surface by the production of photon scintillations, photomultiplier means operatively connected with the said gamma ray reacting means for receiving such scintillations and converting them into photoelectrons sufficient to produce voltage pulses, means for amplifying said pulses, pulse height analysing means for receiving such amplified pulses and discriminating them both integrally and differentially, and means operatively connected with said analysing and discriminating means for simultaneously producing records showing both amplitude variations in total gamma ray intensity received from the terrain being explored and density variations in gamma ray intensity derived from at least one selected source of the rays in said terrain, the said means for producing a record of the density variations including at least one scaling device adjustable to different scales of demultiplication.

6. An instrument as defined in claim 3, in which the means for producing records is constructed and arranged to make the amplitude record in a continuous line and the density record in at least one broken line.

7. An instrument as defined in claim 6, in which the means for producing records imposes the continuous and broken lines in such relative positions that their indications are mutually complementary.

References Cited in the file of this patent

UNITED STATES PATENTS

| | | |
|---|---|---|
| 2,423,885 | Hammond | July 15, 1947 |
| 2,617,945 | Lord et al. | Nov. 11, 1952 |
| 2,648,012 | Scherbatskoy | Aug. 4, 1953 |
| 2,659,011 | Youmans et al. | Nov. 10, 1953 |
| 2,749,446 | Herzog | June 5, 1956 |
| 2,755,389 | Jones et al. | July 17, 1956 |